United States Patent [19]
Katz

[11] Patent Number: 5,835,984
[45] Date of Patent: Nov. 10, 1998

[54] OPTICAL SCANNER EMPLOYING SMART PIXEL ARRAY

[75] Inventor: Joseph Katz, Stony Brook, N.Y.

[73] Assignee: Symbol Technologies, Inc., Holtsville, N.Y.

[21] Appl. No.: 591,810

[22] Filed: Jan. 25, 1996

[51] Int. Cl.$^6$ ........................................... G06K 7/10
[52] U.S. Cl. ............................. 235/463; 235/462
[58] Field of Search ..................... 235/462, 463

[56] References Cited

U.S. PATENT DOCUMENTS

| | | | |
|---|---|---|---|
| 4,251,798 | 2/1981 | Swartz et al. . | |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,760,248 | 7/1988 | Swartz et al. | 235/472 |
| 4,896,026 | 1/1990 | Krichever et al. | 235/472 |
| 4,942,473 | 7/1990 | Zeevi et al. | 348/281 |
| 5,107,122 | 4/1992 | Barkan et al. | 250/370.01 |
| 5,134,489 | 7/1992 | Sauer | 348/302 |
| 5,243,655 | 9/1993 | Wang | 380/51 |
| 5,262,871 | 11/1993 | Wilder et al. | 348/307 |
| 5,304,786 | 4/1994 | Pavlidis et al. | 235/462 |
| 5,339,090 | 8/1994 | Crossland et al. | 345/90 |
| 5,343,297 | 8/1994 | Tiemann et al. | 348/301 |
| 5,446,271 | 8/1995 | Cherry et al. | 235/462 |
| 5,453,604 | 9/1995 | Narabu | 235/462 |
| 5,457,309 | 10/1995 | Pelton | 235/462 |
| 5,487,115 | 1/1996 | Surka | 235/462 |
| 5,504,319 | 4/1996 | Li et al. | 235/462 |
| 5,512,739 | 4/1996 | Chandler et al. | 235/462 |
| 5,739,518 | 2/1998 | Wang | 235/462 |

*Primary Examiner*—Anita Pellman Gross
*Assistant Examiner*—Mark Tremblay

[57] ABSTRACT

A scanner for reading encoded indicia having parts of different reflectivity to incident radiation comprises a detector for detecting incident radiation reflected thereto by the indicia, the detector comprising an array of pixels generating output signals indicative of the reflected radiation incident thereon. The array has signal processing circuits therein in electrical communication with the pixels and receiving the pixel output signals and generating signal processing circuit output signals. A decoder decodes the encoding in the indicia by processing selective of the signal processing circuit output signals. Selection of the signal processing circuit output signals may be in accordance with edge definition content thereof.

18 Claims, 6 Drawing Sheets

OPTICAL SCANNER EMPLOYING SMART PIXEL ARRAY

BACKGROUND OF THE INVENTION

1. Field of the Invention

The present invention relates generally to an optical scanner and more particularly pertains to an optical scanner employing "smart pixels".

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are decoded into a alphanumerical characters that are intended to be descriptive of the article or some characteristic thereof. Such characters are typically represented in digital form and utilized as an input to a data processing system for applications in point-of-sale processing. Inventory control, and the like scanning systems of this general type have been disclosed, for example, in U.S. Pat. Nos. 4,251,798; 4,369,361; 4,387,297, 4,409,470; 4,760,248; and 4,896,026, all of which have been assigned to the same assignee as the instant application.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

A further known symbology is known as two-dimensional (2D) symbology and is discussed in detail in commonly-assigned U.S. Pat. No. 5,243,655 and No. 5,304,786, which are incorporated herein by this reference thereto. Briefly, that symbology involves a variable number of component symbols or "codewords" per row of a nonvolatile electro-optical read-only memory imprinted on a substrate. Codewords in alternating rows are selected from mutually exclusive subsets of a mark pattern, the subsets being defined in terms of particular values of a discriminator function which is illustrated in the referenced patents as being a function of the widths of bars and spaces in a given codeword.

Scanning systems include a sensor or photodetector which functions to detect light reflected from the symbol. The photodetector is therefore positioned in the scanner or in an optical path in which it has a field of view which extends across and slightly past the symbol. A portion of the light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Decoding in 2D symbology is discussed particularly and shown in various flowcharts set forth in the 2D symbology patents incorporated by reference and above identified.

Some known bar code readers incorporate a detector based upon solid state imaging (SSI) technology, e.g., charge coupled devices (CCDs), CMOS imagers, etc. SSIs are an array of many detectors, typically referred individually as "pixels". The entire symbol is flooded with light from the reader or ambient light, and each CCD pixel is read out to determine presence of bars or spaces.

CCD array output information is of high density, greatly assisting in symbol reading. For example, a CCD array having seven hundred by seven hundred pixels will provide almost one-half million bytes of output information. All such bytes are conveyed to memory and a processor then examines the memory for symbology contained therein. In many cases, each pixel content is represented by eight-bit values. Disadvantage attends both the large memory requirement and the need for a quite powerful processor. The symbology indeed may be defined in as little as five to ten percent of the SSI array output information and the memory and processor power are accordingly not efficiently used.

Smart pixels have come to be known in recent years wherein "localized intelligence" is made available at the site or adjacent the site of a pixel and pixel output signals can be processed accordingly to provide a smart pixel output signal which has enhanced intelligence beyond the simple pixel output. U.S. Pat. No. 5,339,090 describes a variety of smart pixel species of localized intelligence, inclusive of communication between pixels of an array or among pixels of different arrays, and carrying out thresholding within an array or among arrays.

SUMMARY OF THE INVENTION

The present invention has as its primary object the improvement of bar code scanners and scanning systems through the incorporation of smart pixels therein.

A more particular object of the invention is to lessen memory and processing power requirements for CCD bar code scanners.

In attaining these and other objects, the invention provides a bar code scanner with smart pixels comprised of a pixel and circuitry disposed at the pixel site which processes the pixel output in a manner enhancing bar code detection by the scanner and simplifying decoding of bar codes, particularly is lessening decoder memory and processing power requirements.

The invention looks further to circuitry disposed at pixel sites which processes the outputs of plural pixels which may be respective adjacent pixels in the array. The invention also contemplates additional circuitry in the SSI array which processes the outputs of the circuitry processing the outputs of plural pixels, i.e., a smart pixel array having plural level smart pixel circuitry.

A scanner is accordingly provided for reading encoded indicia having parts of different reflectivity to incident radiation comprising a detector for detecting incident radiation reflected thereto by the indicia, the detector comprising an array of pixels generating output signals indicative of the reflected radiation incident thereon. The array has signal processing circuits therein in electrical communication with the pixels and receiving the pixel output signals and generating signal processing circuit output signals. A decoder decodes the encoding in the indicia by processing selective of the signal processing circuit output signals. Selection of the signal processing circuit output signals may be in accordance with edge definition content thereof.

BRIEF DESCRIPTION OF THE DRAWINGS

The foregoing objects and advantages of the present invention may be more readily understood by one skilled in the art with reference being had to the following detailed description of preferred embodiments thereof, taken in conjunction with the accompanying drawings wherein like elements are designated by identical reference numerals throughout the several views, and in which.

DETAILED DESCRIPTION OF PREFERRED EMBODIMENTS AND PRACTICES

Figure 1:
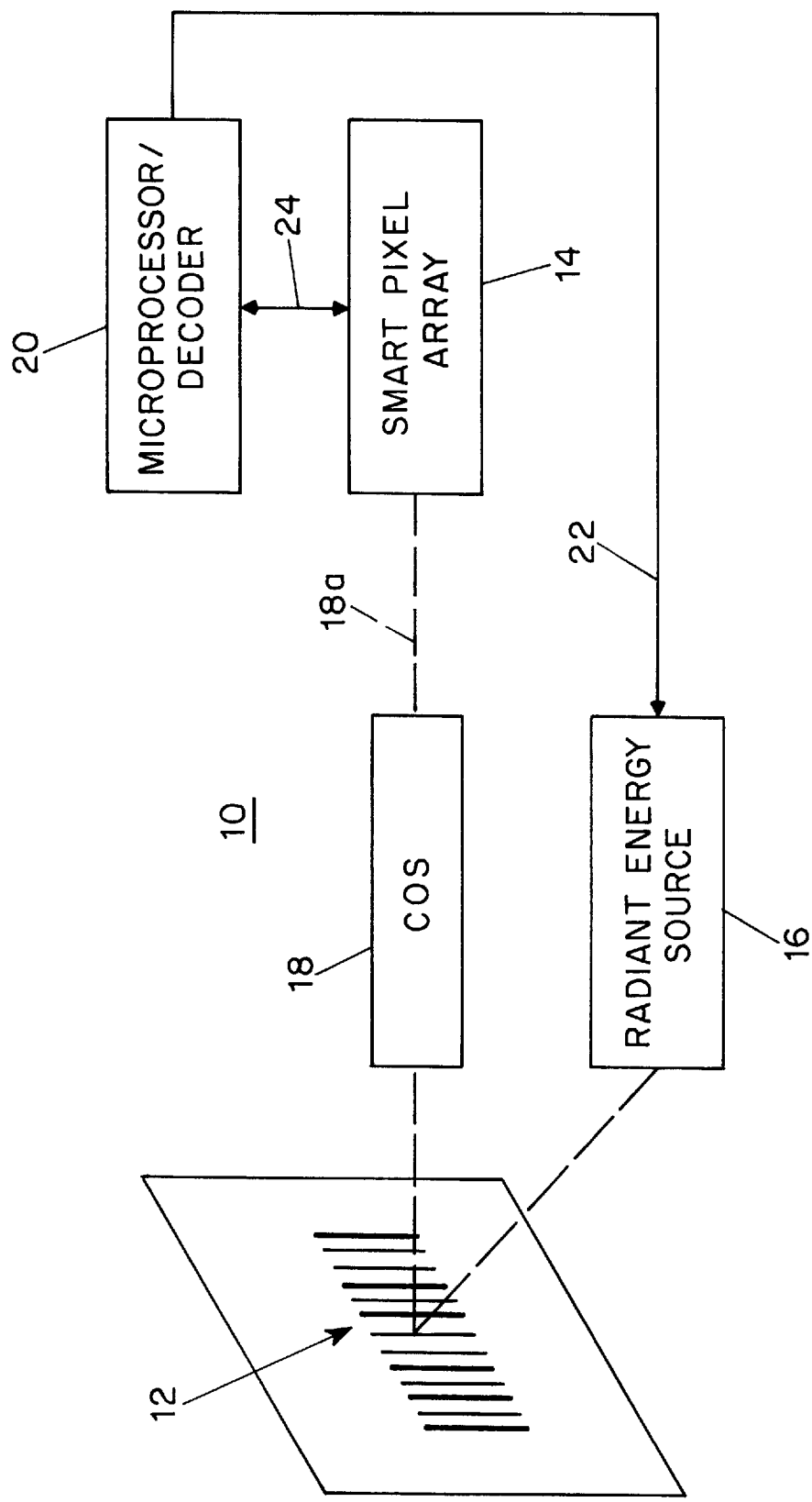
FIG. 1 is a general block diagram of a bar code scanning system in accordance with the invention.

Referring to FIG. 1, system 10 is adapted for reading bar code 12 and includes smart pixel array 14, radiant energy source 16, collection optical system 18 and microprocessor/decoder 20. Bar code 12 may be one- or two-dimensional and may be encoded in any desired manner. Unit 20 control system 10 activity, as discussed below in connection with FIG. 6, includes suitable memory for digital signal storage, and implements decoding algorithms.

Radiant energy source 16 may be comprised of a source of infrared energy and is intensity-controlled by input thereto over line 22 from unit 20. Collection optical system 18 has optical axis 18a and a lens or lenses for focusing energy reflected by bar code 12 onto smart pixel array 14.

Smart pixel array 14 provides input over bi-directional line (bus) 24 to unit 20 advising of smart pixel circuitry of the array which contains bar code information and locations thereof in the array and unit 20 accordingly addresses and read such circuitry.

Figure 2:
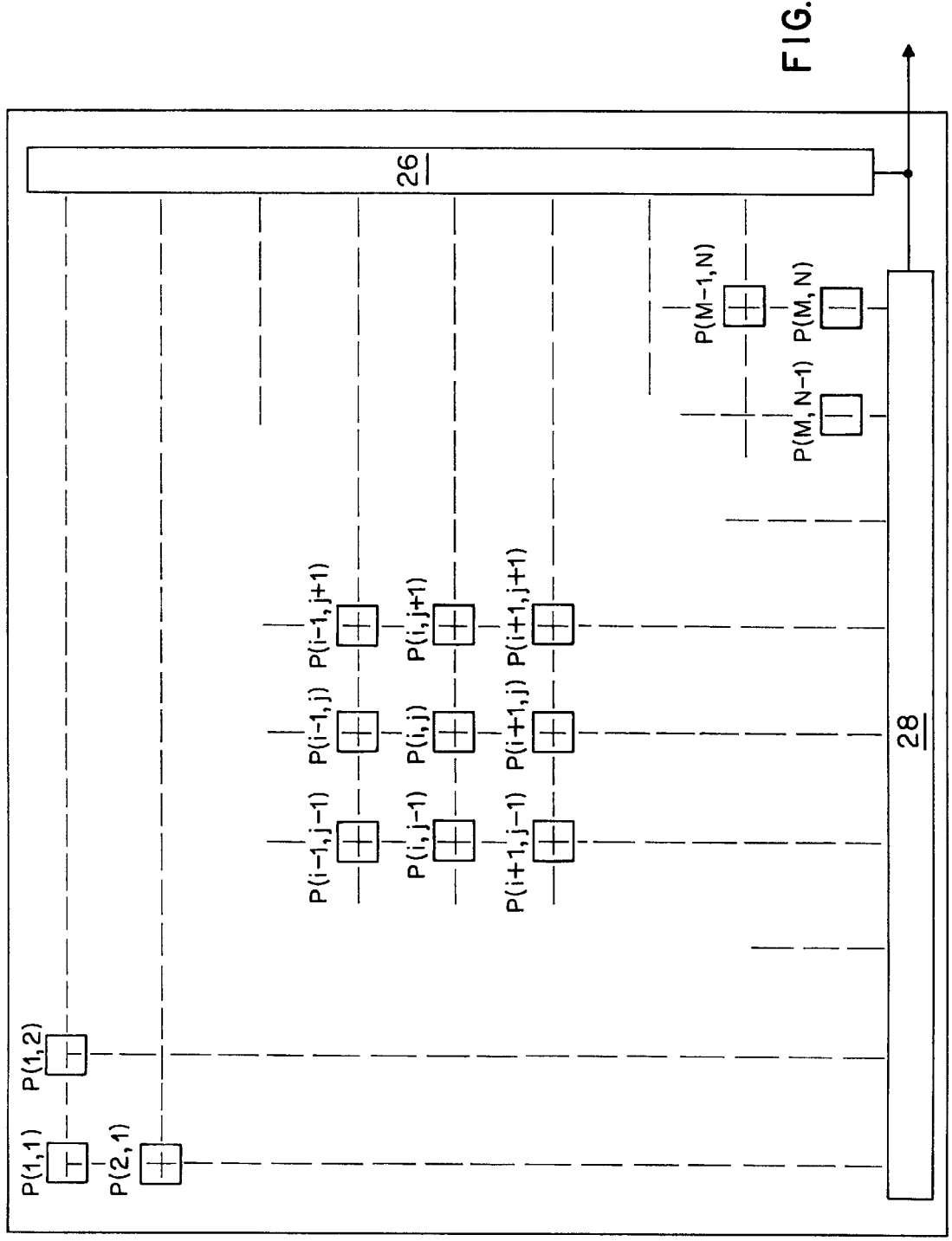
FIG. 2 shows a typical SSI pixel array.

Referring to FIG. 2, it depicts a standard CMOS imager having an M times N (M×N) array of pixels P commencing in the upper left corner with pixel P(1,1) and ending in the lower right corner P(M,N). Read out electronic units are indicated at 26 and 28 and, in the conventional SSI pixel array, read pixels directly. In this respect, it is to be noted that, in accordance with the subject invention, array pixels themselves are not read by the unit 20 since, as will be developed below, the smart pixel circuitry interrogates pixels of the smart pixel array.

Figure 3:
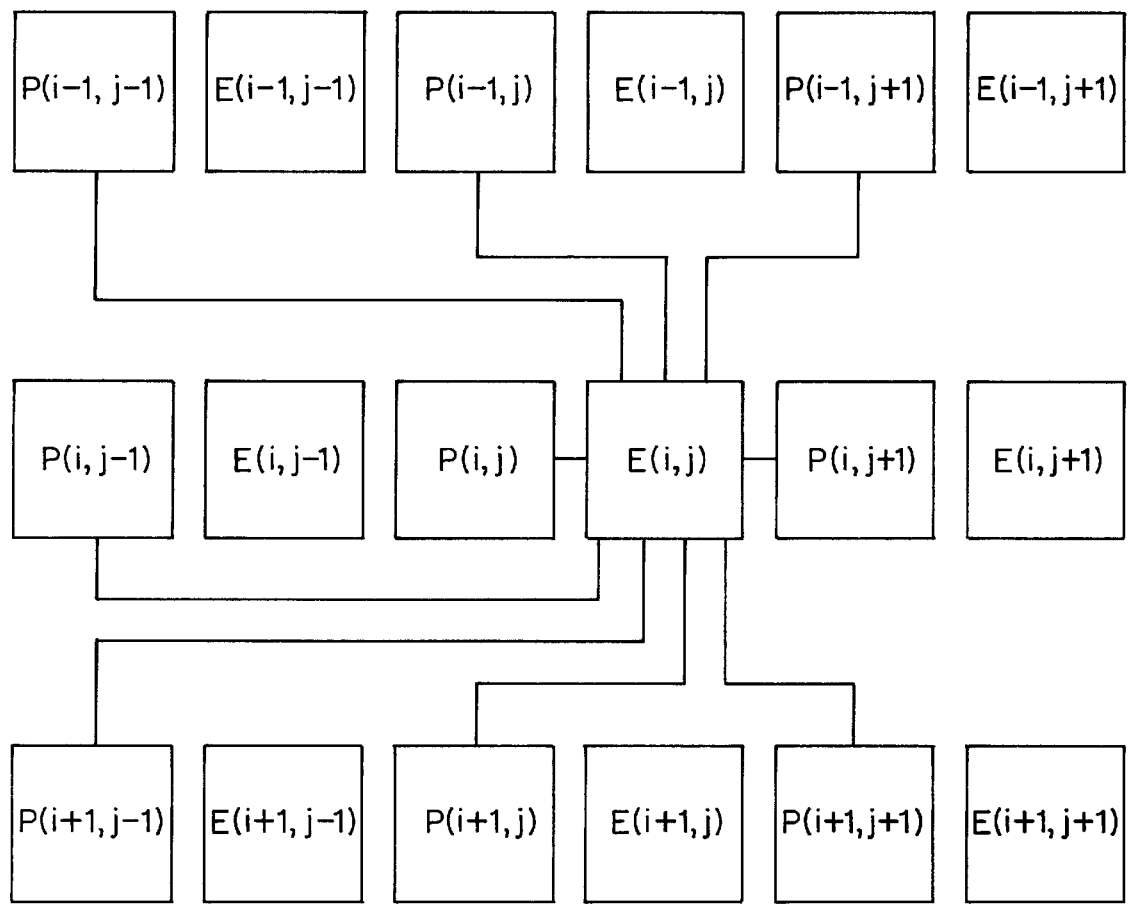
FIG. 3 shows a portion of the FIG. 2 SSI pixel array, but incorporating pixel output signal processing circuitry in accordance with the subject invention to provide a smart pixel array.

An adjacent nine of the pixels of FIG. 2 array are depicted in FIG. 3, being in three rows. The uppermost row has pixels P(i−1,j−1), P(i−1,j) and P(i−1,j+1). The middle row has pixels P(i,j−1), P(i,j) and P(i,j+1). The lower row has pixels P(i+1,j−1), P(i+1,j) and P(i+1,j+1).

Processing circuitry E(i−1,j−1) is disposed between pixels P(i−1,j−1) and P(i−1,j). Processing circuitry E(i−1,j) is disposed between pixels P(i−1,j)P and P(i−1,j+1). Processing circuitry E(i−1,j+1) is disposed rightwardly adjacent pixel P(i−1,j+1) and in the succession would be leftwardly of pixel P(i−1,j+2), which is not shown.

Processing circuitry E(i,j−1) is disposed between pixels P(i,j−1) and P(i,j). Processing circuitry E(i,j) is disposed between pixels P(i,j) and P(i,j+1). Processing circuitry E(i, j+1) is disposed rightwardly adjacent pixel P(i,j+1).

Processing circuitry E(i+1,j−1) is disposed between pixels P(i+1,j−1) and P(i+1,j). Processing circuitry E(i+1,j) is disposed between pixels P(i+1,j) and P(i+1,j+1). Processing circuitry E(i+1,j+1) is disposed rightwardly adjacent pixel P(i+1,j+1).

As is indicated for processing circuitry E(i,j), it is connected with all nine pixels of FIG. 3 and receives as inputs the respective output signals of the pixels. In effect, E(i,j) looks at a three times three (3×3) pixel environment, i.e., a pixel and certain nearest neighbor pixels, and determines whether there is an edge in the environment and what its direction is. While not illustrated to avoid clutter in FIG. 3, each E processing circuit is likewise connected to a three times three pixel environment.

Referring to FIGS. 4(a) through 4(f), exemplary conditions of the nine pixels of FIG. 3 looked at by processing circuitry E(i,j) are shown. The FIG. 4(a) pixel sees black, white or black and white combined at a level below a given threshold level. E(i,j) would assign a digital four-bit value of 0000 to this condition. In that the most significant (leftwardmost) bit is 0, E(i,j) would advise that the pixel is not an edge defining pixel.

Each of the pixels of FIGS. 4(b) through 4(i) see mixtures of white (W) and black (B) which are above the given threshold level.

Figure 4A:
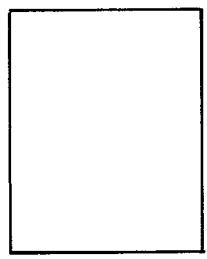
FIGS. 4(a) through 4(i) show black (B) and white (W) conditions in a three by three pixel subarray of the FIG. 3 smart pixel array.
Figure 4B:
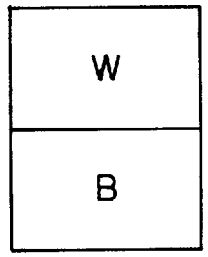

The FIG. 4(b) pixel sees white above black and E(i,j) would assign a digital four-bit value of 1000 to this condition.

Figure 4C:
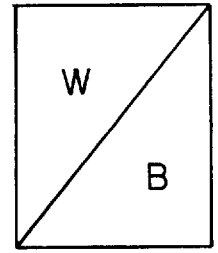

The FIG. 4(c) pixel sees a diagonal mix of white and black, with white leftwardly upwardly of black and E(i,j) would assign a digital four-bit value of 1001 to this condition.

Figure 4D:
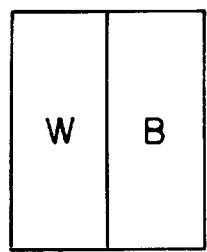

The FIG. 4(d) pixel sees white leftwardly of black and E(i,j) would assign a digital four-bit value of 1010 to this condition.

Figure 4E:
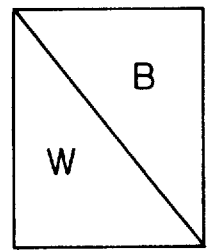

The FIG. 4(e) pixel sees a diagonal mix of white and black, with white leftwardly downwardly of black and E(i,j) would assign a digital four-bit value of 1011 to this condition.

Figure 4F:
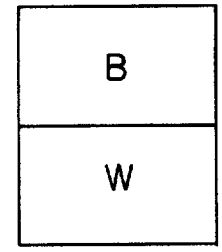

The FIG. 4(f) pixel sees white below black and E(i,j) would assign a digital four-bit value of 1100 to this condition.

Figure 4G:
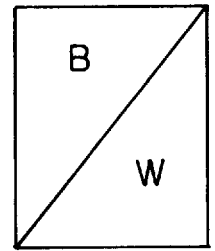

The FIG. 4(g) pixel sees a diagonal mix of white and black, with black leftwardly upwardly of white and E(i,j) would assign a digital four-bit value of 1101 to this condition.

Figure 4H:
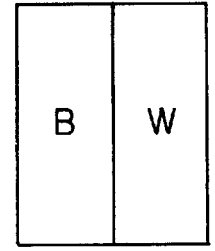

The FIG. 4(h) pixel sees black leftwardly of white and E(i,j) would assign a digital four-bit value of 1110 to this condition.

Figure 4I:
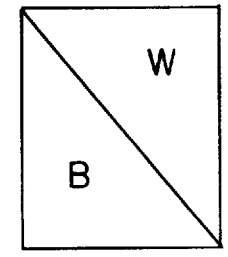

The FIG. 4(i) pixel sees a diagonal mix of white and black, with white rightwardly upwardly of black and E(i,j) would assign a digital four-bit value of 1111 to this condition.

In the example of FIGS. 4(b) through 4(i), a full edge transition from white to black is detectable by E(i,j) based on its digital value assignments and its recognition of the digital value progression defining an edge. The direction of the edge is further known from the digital value progression, i.e., whether it is incrementing or decrementing.

In accordance with the invention, all of the E processing circuits are interrogated, and not the pixels themselves, since the E circuits have effected pixel interrogation. Those E processing circuits which detect edge definition are read, under microprocessor control, to memory along with their respective locations in the smart pixel array. Those E processing circuits which do not detect edge definition are so seen by the microprocessor and are ignored and not read to memory.

The invention contemplates expansion of the arrangement of FIG. 3, e.g., into an arrangement wherein E processing circuits are provided to look at two nearest neighbors, such as looking at a 5×5 set of pixels. The larger set enables more sophisticated processing, such as obtaining a second derivative and finer resolution in edge detection.

Figure 5:
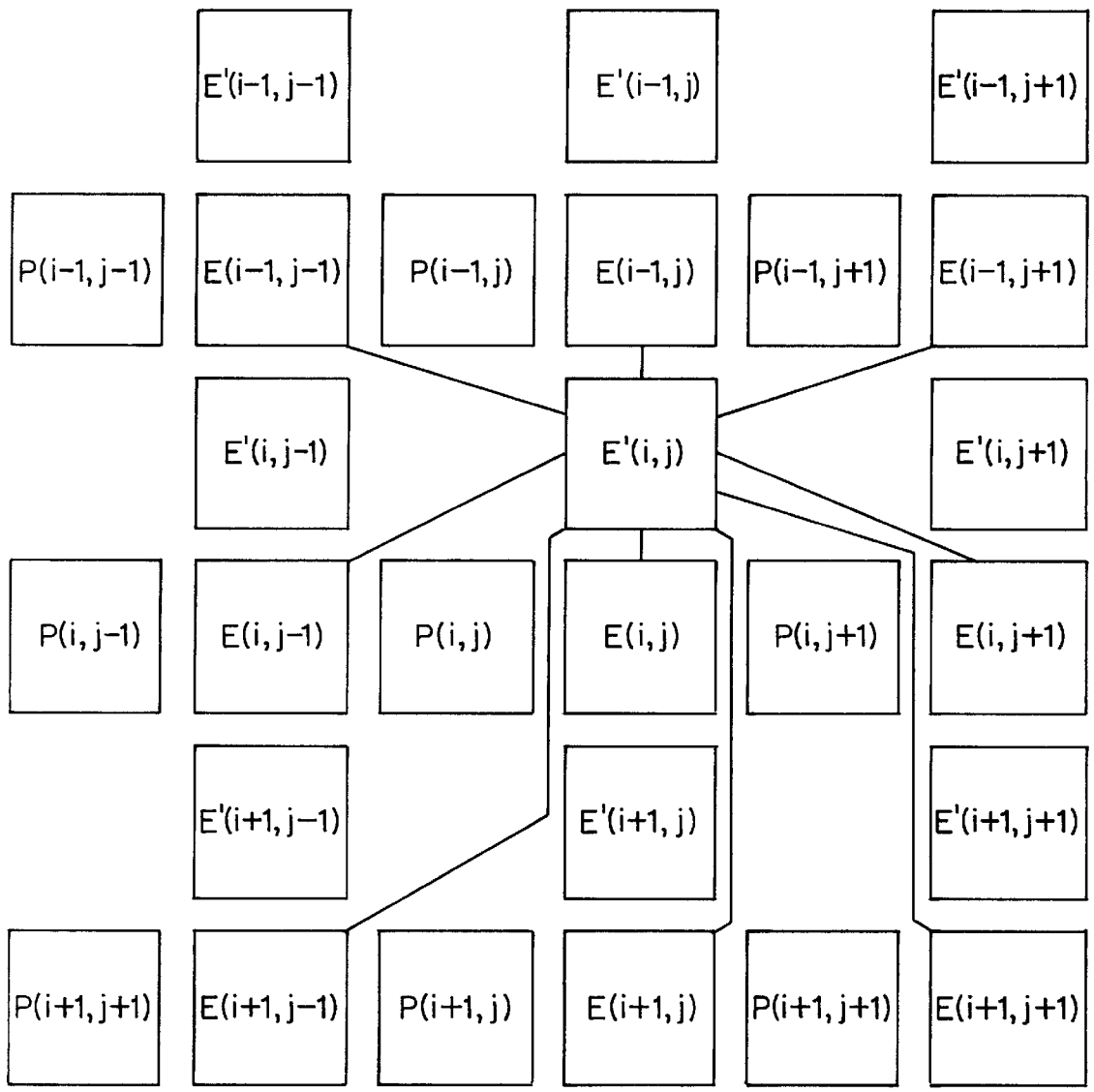
FIG. 5 shows a portion of the FIG. 3 SSI smart pixel array, modified to incorporate second processing circuits.

Turning now to FIG. 5, the arrangement of FIG. 3 is repeated, however, with the E processing circuits comprising a first level of discernment and E' circuits added and comprising a second level of discernment.

An upper row of E' circuits includes E'(i−1,j−1), E'(i−1,j) and E'(i−1,j+1). A middle row of E' circuits includes E'(i,j−1), E'(i,j) and E'(i,j+1). A lower row of E' circuits includes E'(i+1,j−1), E'(i+1,j) and E'(i+1,j+1).

As is indicated for processing circuitry E'(i,j), it is connected with all nine E circuits and receives as inputs the respective output signals of the nine E circuits. While not illustrated to avoid clutter in FIG. 5, each E' processing circuit is likewise connected. In functioning as a second level of discernment within the SSI matrix, processing circuitry E'(i,j) functions to filter false edges, etc., and generally to reduce noise.

Figure 6:
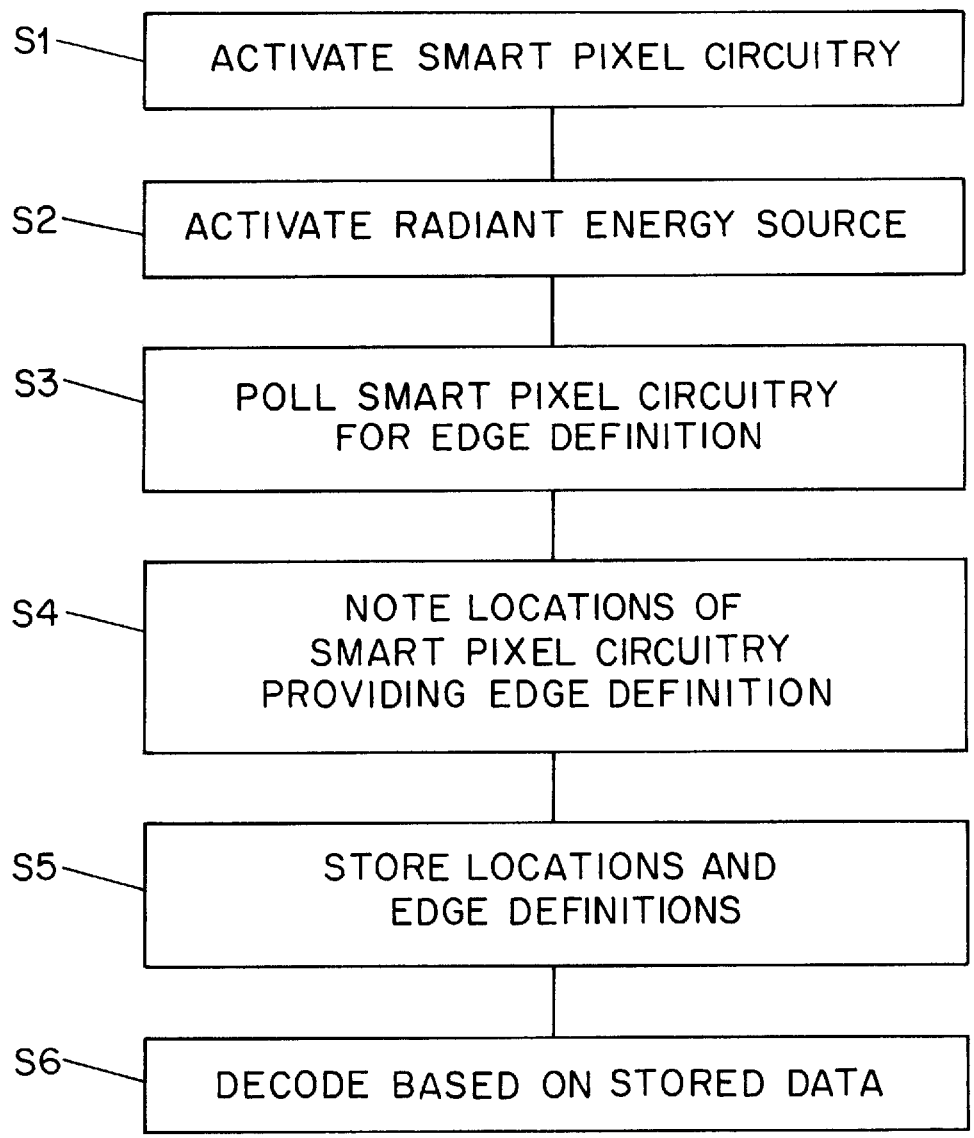
FIG. 6 is a flowchart indicating operation of microprocessor/decoder 20 of the FIG. 1 system.

In its pre-decoding routine, unit 20 implements the flow chart shown in FIG. 6. In step S1, ACTIVATE SMART PIXEL CIRCUITRY, the microprocessor initiates the pre-processing activity in the smart pixel chip by activating the E (FIG. 3), or E and E' (FIG. 5), processing circuitry. In step S2, ACTIVATE RADIANT ENERGY SOURCE, unit 20 energizes source 16 of FIG. 1 to illuminate the bar code target 12. In step S3, POLL SMART PIXEL CIRCUITRY FOR EDGE DEFINITION, unit 20 notes those E or E' processing circuits which provide edge definition. In step S4, NOTE LOCATIONS OF SMART PIXEL CIRCUITRY PROVIDING EDGE DEFINITION, unit 20 notes the locations in the SSI array of the E or E' processing circuits which provide edge definition. In step S5, STORE LOCATIONS AND EDGE DEFINITIONS, unit 20 takes in the desired lessened SSI array output signals. In step S6, DECODE BASED ON STORED DATA, unit 20 enters its decoding routine, which may be any of the routines above noted, one-dimensional or two-dimensional, and is implemented using the lessened SSI array output signals stored in step S5.

By way of summary of the foregoing and introduction to the ensuing claims, the invention will be seen to provide, in one aspect, a scanner for reading encoded indicia having parts of different reflectivity to incident radiation, comprising detector means for detecting incident radiation reflected thereto by the indicia, the detector comprising an array of pixels generating output signals indicative of the reflected radiation incident thereon, the array having circuits therein in electrical communication with the pixels and receiving and processing the output signals of the pixels and decoding means for decoding the encoding in the indicia, the decoding means inputting output signals from selective of the processing circuits.

The circuits in the array process a given characteristic of the output signals of the pixels, particularly, content indicative of the reflected radiation, and the circuits assign digital values correspondingly with such content.

Otherwise viewed, the invention will be seen to provide a scanner for reading encoded indicia having parts of different reflectivity to incident radiation, comprising detector means for detecting incident radiation reflected thereto by the indicia, the detector comprising an array of M times N pixels generating output signals indicative of reflected radiation incident thereon and signal processing circuits in the array in electrical communication with the pixels, the signal processing circuits providing signal processing circuit output signals indicative of reflected radiation incident on less than M times N of the pixels and decoding means for decoding the encoding in the indicia by processing the signal processing circuit output signals.

While several embodiments and variations of the present invention for an optical scanner are described in detail herein, it should be apparent that the disclosure and teachings of the present invention will suggest many alternative designs to those skilled in the art.

What is claimed is:

1. A scanner for reading encoded indicia having parts of different reflectivity to incident radiation, comprising:
   (a) a detector for detecting incident radiation reflected thereto by the indicia, the detector comprising an array of pixels generating electrical image output signals indicative of the reflected radiation incident thereon;
   (b) a plurality of edge-feature extraction circuits in electrical communication with said pixels, wherein each of said edge feature extraction circuits receives electrical image output signals from a subset of said pixel array and generates an electrical edge feature output signal indicative of an edge-feature detection status; and
   (c) a decoder for decoding the indicia by processing selective ones of said plurality of electrical edge-feature output signals;
whereby said electrical edge-feature output signals are generated by extracting an edge-feature information out of said image output signals and a full image resolution is achieved without reduction of speed of said decoder.

2. The scanner claimed in claim 1, including a memory for storing said selective signal processing circuit output signals.

3. The scanner claimed in claim 1, including a microprocessor for selecting said selective signal processing circuit output signals correspondingly with indication of edge definition in said signal processing circuit output signals.

4. The scanner claimed in claim 1, wherein each of said signal processing circuits is in electrical communication with plural of said pixels.

5. The scanner claimed in claim 4, wherein said signal processing circuit output signals are indicative of the reflected radiation incident on pixels with which they are in electrical communication.

6. The scanner claimed in claim 5, wherein said signal processing circuits generate said signal processing circuit output signals when the reflected radiation incident on pixels with which they are in electrical communication exceeds a given threshold level.

7. The scanner claimed in claim 6, wherein said signal processing circuits generate said signal processing circuit output signals as digital signals which define digital values correspondingly with black and white content of the reflected radiation incident on pixels with which they are in electrical communication.

8. A scanner for reading encoded indicia having parts of different reflectivity to incident radiation, comprising:
 (a) a detector for detecting incident radiation reflected thereto by the indicia, the detector comprising an array of pixels generating electrical image output signals indicative of the reflected radiation incident thereon;
 (b) a plurality of first edge-feature extraction circuits in electrical communication with said pixels, wherein each of said first edge-feature extraction circuits receives electrical image output signals from a subset of said pixel array and generates an electrical edge-feature output signal indicative of an edge-feature detection status;
 (c) a plurality of second edge-feature extraction circuits each in electrical communication with said plurality of said first edge-feature extraction circuits, wherein each of said second edge-feature extraction circuits receives edge-feature output signals from a subset of said plurality of said first edge feature extraction circuits and generates an enhanced electrical edge-feature output signal indicative of an enhanced edge-feature detection status; and
 (d) a decoder for decoding the indicia by processing selective ones of said enhanced electrical edge-feature output signals;
whereby a full image resolution is achieved without reduction of speed of said decoder.

9. The scanner claimed in claim 8, including a memory for storing said selective second circuit output signals.

10. The scanner claimed in claim 8, including a microprocessor for selecting said selective second circuit output signals correspondingly with indication of edge definition in said second circuit output signals.

11. The scanner claimed in claim 8, wherein each of said signal processing circuits is in electrical communication with plural of said pixels.

12. The scanner claimed in claim 11, wherein said signal processing circuit output signals are indicative of the reflected radiation incident on pixels with which they are in electrical communication.

13. The scanner claimed in claim 12, wherein said signal processing circuits generate said signal processing circuit output signals when the reflected radiation incident on pixels with which they are in electrical communication exceeds a given threshold level.

14. The scanner claimed in claim 13, wherein said signal processing circuits generate said signal processing circuit output signals as digital signals which define digital values correspondingly with black and white content of the reflected radiation incident on pixels with which they are in electrical communication.

15. The scanner claimed in claim 8, wherein said second circuits comprise filter circuits.

16. The scanner claimed in claim 8, wherein said second circuits comprise noise reduction circuits.

17. A scanner for reading an encoded indicia having parts of different reflectivity to incident radiation, comprising:
 (a) a detector for detecting incident radiation reflected thereto by the indicia, the detector comprising an array of M times N pixels generating electrical image output signals indicative of reflected radiation incident thereon;
 (b) a plurality of edge-feature extraction circuits in electrical communication with said pixels, wherein each of said edge feature extraction circuits receives electrical image output signals from a subset of said M times N pixel array and generates an electrical edge-feature output signal indicative of an edge-feature detection status; and
 (c) a decoder for decoding the indicia by processing selective ones of said plurality of electrical edge-feature output signals;
whereby said electrical edge-feature output signals are generated by extracting an edge-feature information out of said image output signals and a full image resolution is achieved without reduction of speed of said decoder.

18. A scanner for reading an encoded indicia having parts of different reflectivity to incident radiation, comprising:
 (a) a detector for detecting incident radiation reflected thereto by the indicia, the detector comprising an array of M times N pixels generating electrical image output signals indicative of reflected radiation incident thereon;
 (b) a plurality of first edge-feature extraction circuits in electrical communication with said pixels, wherein each of said edge feature extraction circuits receives electrical image output signals from a subset of said M times N pixel array and generates an electrical edge-feature output signal indicative of an edge-feature detection status;
 (c) a plurality of second edge-feature extraction circuits each in electrical communication with said plurality of said first edge-feature extraction circuits, wherein each of said second edge-feature extraction circuits receives edge-feature output signals from a subset of said plurality of said first edge feature extraction circuits and generates an enhanced electrical edge-feature output signal indicative of an enhanced edge-feature detection status; and
 (d) a decoder for decoding the indicia by processing selective ones of said enhanced electrical edge-feature output signals;
whereby a full image resolution is achieved without reduction of speed of said decoder.

* * * * *